3,518,737
CUTTING TOOL
Robert J. Hood, East Hartford, Conn., assignor to Eastern Tool Company, Inc., East Hartford, Conn., a corporation of Connecticut
Filed Aug. 24, 1967, Ser. No. 662,919
Int. Cl. B26d 1/00
U.S. Cl. 29—96                                            7 Claims

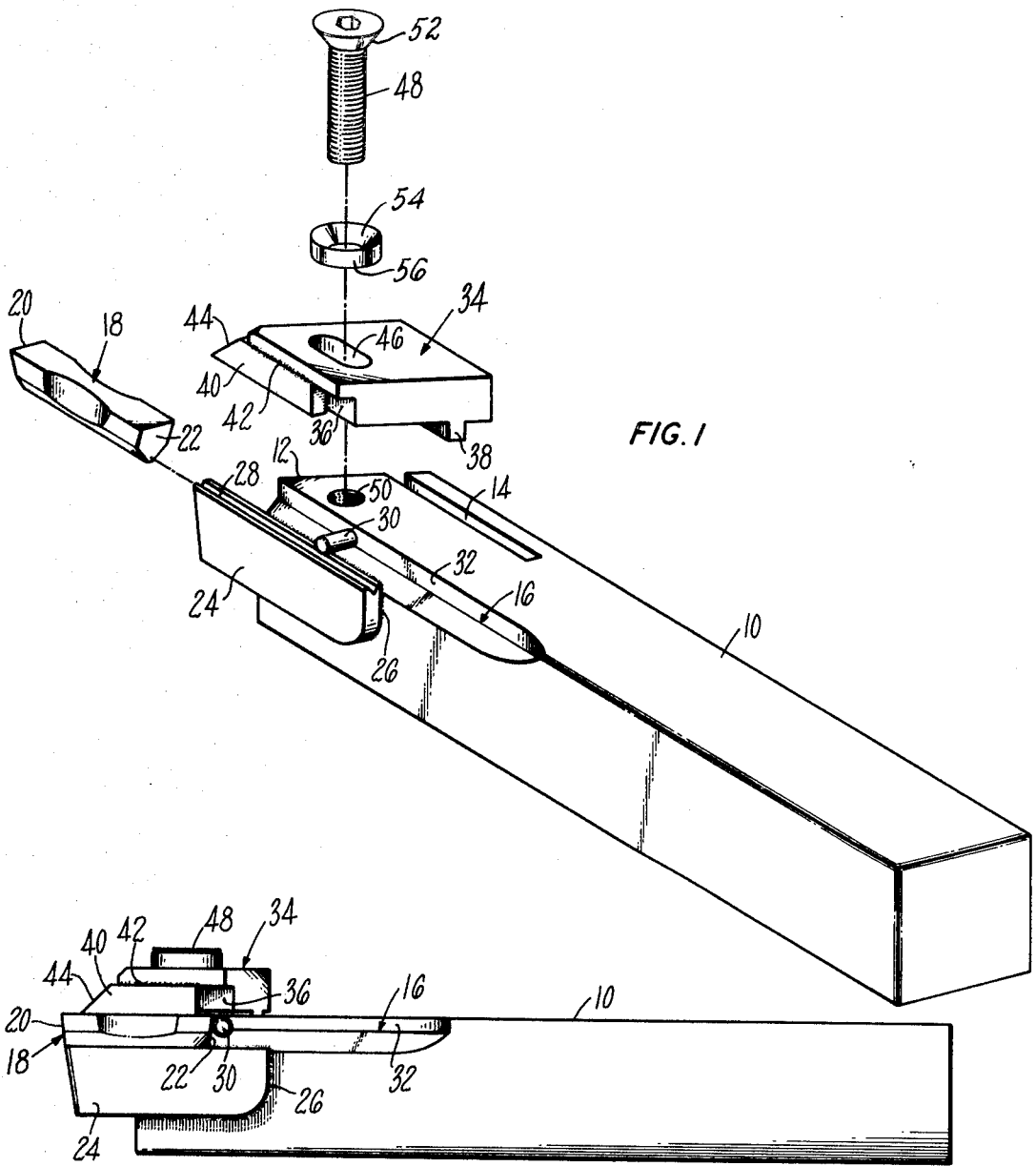

ABSTRACT OF THE DISCLOSURE

A holder for tools employed to machine workpieces, the holder having a tool supporting member and a chip breaker which are respectively brazed to the shank and clamp portions of the holder and which are both comprised of a material which is harder than the remainder of the holder. The chip breaker is locked by a set screw and washer which have cooperating inclined faces, the chip breaker being adjustable only longitudinally with respect to the cutting tool, and the cutting tool is positioned against a nonadjustable stop.

BACKGROUND OF THE INVENTION

Field of the invention

The present invention relates to metal working wherein the surface of a body is brought to a desired contour by means of a cutting tool. More particularly, the present invention is directed to a holder for cutting tool inserts which are brought into contact with a workpiece during machining. Accordingly, the general objects of the present invention are to provide new and improved methods and apparatus of such character.

Description of the prior art

Holders for hardened cutting tools are well known in the art. Such tool holders typically comprise a shank portion which will be engaged by a tool post or other suitable supporting means and a head portion which receives and supports the actual cutting tool. The cutting tool will typically be an elongated member comprised of a carbide or similar material. The cutting tool, commonly known as an insert, is received and held by the head portion of the tool holders and extends outwardly therefrom a short distance. The tool holder may also comprise a member known as a chip breaker which controls the size and length of the chip produced as the work is machined while simultaneously directing the chip away from the cutting edge of the tool.

Among the inherent deficiencies possessed by prior art tool holders was the fact that the member which supported the cutting tool insert was bolted to the shank portion of the tool holder. In the interest of economy, this insert supporting member was typically comprised of the same material as the tool holder body, which material is relatively soft. The softness of the material and the belt holes made the supporting member susceptible to deflection when the insert was brought into contact with the workpiece. In addition, breakage of the supporting members was common, the breakage being attributable to the fact that the supporting member was weakened when the mounting bolt holes were drilled therein.

The chip breakers associated with prior art tool holders could generally not be adjusted longitudinally of the cutting tool insert and, as in the case of the insert supporting member, the chip breaker was usually comprised of the same material as the body of the tool holder. The inability to longitudinally adjust the position of the chip breaker relative to the cutting edge prevented control of the manner in which the chip came off the work. In those cases where the chip breaker has been longitudinally adjustable, it has been by means of a longitudinal slot in the chip breaker, and the slot tends to weaken the chip breaker. It has also generally been the practice to fabricate the chip breaker from the same material as the body of the tool holder, such practice being dictated by economic consideration since the chip breaker also constitutes the clamp for holding the insert on its supporting member and thus must have a body portion of sufficient size so that it can be suitably affixed to the shank of the tool holder. This practice of fabricating the chip breaker from the same material as the body of the tool holder has resulted in rapid wear of the chip breaker.

Prior art tool holders have typically provided for longitudinal adjustment of the carbide inserts by means of a set screw. The use of a set screw for adjustment does not provide the repeatability necessary for many types of work.

SUMMARY OF THE INVENTION

The present invention relates to a tool holder which is characterized by a chip breaker and insert supporting member comprised of a material or materials which are considerably harder than the body of the tool holder. The insert supporting member is brazed to the side of the tool holder shank while the chip breaker is brazed to the body of the clamp member which is in turn bolted to the top of the tool holder shank by a set screw and washer which have cooperating inclined faces. The clamping member, and thus the chip breaker, is adjustable longitudinally thereby permitting control of the manner in which the chip comes off the work. A removable, hardened dowel pin is held by the shank of the cutting tool and extends outwardly into the region occupied by the cutting tool. Repeatability is insured by positioning the insert against the shank because there is always contact between duplicate precision ground surfaces.

BRIEF DESCRIPTION OF THE DRAWING

The present invention will be better understood and its various advantages will become obvious to those skilled in the art by reference to the accompanying drawing wherein like reference numerals refer to like elements in the various figures and in which:

FIG. 1 is an exploded perspective view of a preferred embodiment of a tool holder in accordance with the present invention.

FIG. 2 is a side elevation view of the tool holder of FIG. 1.

FIG. 3 is a front elevation view of the tool holder of FIG. 1.

DESCRIPTION OF THE PREFERRED EMBODIMENT

Referring now simultaneously to FIGS. 1, 2 and 3, the tool holder of the present invention comprises a shank or body portion 10 which will typically be comprised of material having hardness in the range of 55 to 75 Rockwell C. Shank portion 10 will usually be formed from a square stock which is cut off at an angle to form a front face 12 inclined at an angle to the axis of shank 10. A groove 14 is machined in the upper surface of shank 10 and extends longitudinally inward from front face 12. The purpose of groove 14 will be discussed below. Shank portion 10 is also machined as shown to provide a longitudinally extending recessed portion 16 along the upper edge thereof.

The tool holder of the present invention is designed for use with an elongated cutting tool or insert having oppositely disposed cutting edges. Such an insert is indicated generally at 18 and has precision ground cutting surfaces or edges 20 and 22.

Insert 18, when positioned in the tool holder, is supported by a shim plate indicated generally at 24. In accordance with the present invention, shim plate 24 is brazed, as shown at 26, to the side of shank portion 10. Plate 24 may be comprised of a cast alloy such as Tantung with a hardness of from 63 to 66 Rockwell C. Alternately, shim plate 24 could be comprised of a high speed steel, a carbide, or a reasonably good cast steel alloy material. The upper surface of shim plate 24 is provided with a V shaped groove 28 which mates with a complementary shaped bottom portion of insert 18. Shim plate 24 extends outwardly from the front surface 12 of shank portion 10 by one-quarter to one-third of its length.

A hardened dowel pin 30 is inserted in a hole provided therefor in the side 32 of recessed portion 16 of shank 10 and extends outwardly perpendicular to the apex of the V shaped groove 28 in plate 24. Insert 18 is installed by sliding rearwardly in groove 28 until precision ground surface 22 contacts hardened pin 30. During machining, when cutting edge 20 becomes worn, the insert will be reversed. Machining may then be resumed, using cutting edge 22, with less than 0.001 inch deviation because the hardened dowel pin 30 will be in contact with the precision ground surface 20. That is regardless of which of surfaces 20 or 22 is being used as the cutting edge, the other edge abuts pin 30 to locate the insert, and high repeatability positioning of insert 18 is thus assured because a precision ground surface is always being used to position the insert.

The means for retaining the insert 18 in groove 28 of plate 24 comprises a clamp member indicated generally at 34. The main portion of clamp member 34 is comprised of the same material as shank portion 10. This main portion has an L-shaped recess 36 machined adjacent a lower edge thereof as shown and is provided with a ribbed portion 38 which is complementary in shape with groove 14 in shank portion 10.

A chip breaker 40 is positioned in recess 36 and brazed to clamp member 34 as shown at 42. Chip breaker 40 will typically be comprised of the same or a similar material as plate 24. Chip breaker 40 engages the upper surface of insert 18 and thus holds the insert in the groove 28 in plate 24. It is preferable that both the chip breaker and supporting plate be comprised of the same or a similar material to eliminate the possibility of thermal induced distortion or misalignment of the insert 18. The front face 44 of chip breaker 40 is inclined rearwardly to thus guide material removed from the work away from the cutting edge.

Control of the manner in which the chip comes off the work is accomplished by longitudinal adjustment of the position of the chip breaker 40. This longitudinal adjustment is permitted by forming clamp member 34 with an elongated slot 46. A set screw 48 passes through slot 46 and engages a hole 50 tapped in the upper surface of shank portion 10. Loosening of set screw 48 permits clamp member 34 to be moved, the limits of forward and rearward motion being defined by elongated slot 46, and the position of the inclined face 44 of chip breaker 40 relative to the cutting edge can thus be adjusted. The head of set screw 48 has an inclined or frustoconical surface 52 which mates with a similarly shaped inclined or frustoconical surface 54 on a washer 56 positioned on top of clamp 34 to insure distribution of locking forces to lock clamp 34 to shank 10. The engagement of rib 38 of clamp 34 by slot 14 in shank portion 10 prevents undesired rotary motion or skewing of the chip breaker and insures that the entire lower surface of the chip breaker will engage the top surface of the insert 18.

As will now be seen, a tool holder characterized by an adjustable chip breaker has been provided. By employing comparatively hard materials for the chip breaker and cutting tool supporting members, wear and deflection problems which have characterized prior art tools have been eliminated. By brazing the chip breaker and cutting tool supporting member respectively to the clamping member and tool holder shank rather than bolting the parts together, the structural integrity of the chip breaker and supporting member has been preserved and thus a breakage problem which characterized the prior art has been eliminated. By means of locating the cutting tool against a hardened, fixed position dowel pin, repeatability within a high degree of tolerance when reversing the cutting tool has been achieved.

While a preferred embodiment has been disclosed and described, various modifications and substitutions may be made thereto without departing from the spirit and the scope of this invention. Accordingly, it is to be understood that the present invention has been described by way of illustration and not limitation.

What is claimed is:

1. Apparatus for supporting an elongated cutting tool insert having oppositely disposed precision ground cutting surfaces, the apparatus comprising:
   a body portion;
   shim plate supporting means permanently affixed to said body portion for supporting a cutting insert, said shim plate supporting means having an insert receiving groove formed therein and said shim plate supporting means being harder than said body portion;
   an elongated slot in said body portion parallel to said insert receiving groove;
   cylindrical stop means extending from said body portion across said insert receiving groove transverse to said groove to position a cutting insert in said groove;
   adjustable clamping means removably attached to said body portion, a portion of said clamping means extending over said shim plate supporting means and cooperating with the groove in said shim plate supporting means to hold a cutting insert during a machining operation, said clamping means having a rib engaging said slot in said body portion; and
   fastener means for securing said clamping means to said body portion, said fastener means including a washer member adapted to engage said clamping means and having a frustoconical inner surface, and a threaded element releasably connected to said body portion, said threaded element having a frustoconical surface mating with said frustoconical surface on said washer member.

2. The apparatus of claim 1 wherein said insert receiving groove is in the top of said shim plate and where said shim plate is brazed to a first side of said body portion.

3. The apparatus of claim 1 wherein said clamping means comprises:
   a first member releasably attached to the top of said body portion, said first member having a portion which extends outwardly over the insert receiving grove in said shim plate supporting means; and
   chip breaker means permanently affixed to said overhanging portion of said first member, said chip breaker means engaging the top of an elongated insert positioned in said insert receiving groove and cooperating with said groove to hold the insert during a machining operation.

4. The apparatus of claim 3 wherein said chip breaker means comprises:
   an elongated member fabricated from a material which is harder than said body portion and said first member.

5. The apparatus of claim 4 wherein said elongated chip breaker member is brazed to said first member and extends in a direction parallel to the insert receiving groove.

6. The apparatus of claim 5 wherein said first member has an elongated hole therethrough extending in a direction substantially parallel to said elongated slot, and wherein said threaded element is a locking screw passing through said elongated hole and threadably engaging said body portion.

7. The apparatus of claim 5 wherein said shim plate and elongated chip breaker member are comprised of the same material.

References Cited

UNITED STATES PATENTS

| | | | |
|---|---|---|---|
| 2,897,580 | 8/1959 | Huber | 29—96 |
| 3,125,798 | 3/1964 | Stein | 29—98 |
| 3,205,558 | 9/1965 | Stier | 29—96 |
| 2,181,023 | 11/1939 | Moore | 29—96 |
| 2,846,756 | 8/1958 | Novkov | 29—96 |
| 2,883,737 | 4/1959 | Wilson | 29—96 |
| 2,955,349 | 10/1960 | York | 29—96 |

HARRISON L. HINSON, Primary Examiner